July 25, 1933.  E. K. LE FEVRE  1,919,437
SHAFT COUPLING
Filed June 28, 1932
Fig.1.
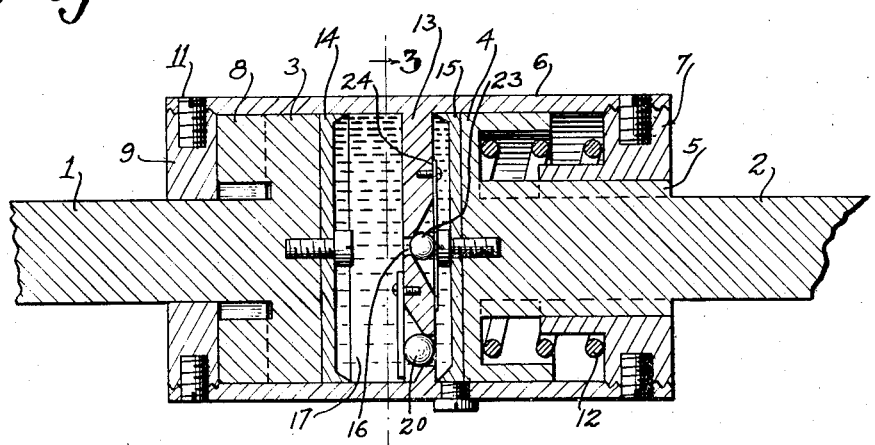
Fig.6.
Fig.2.
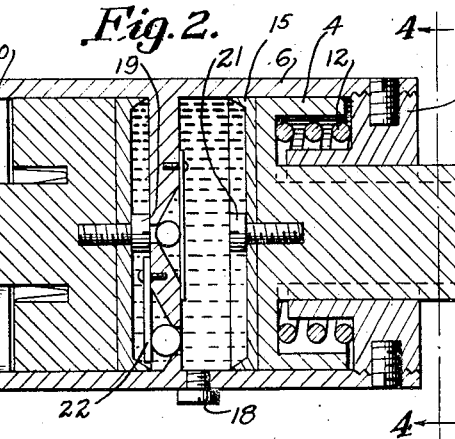
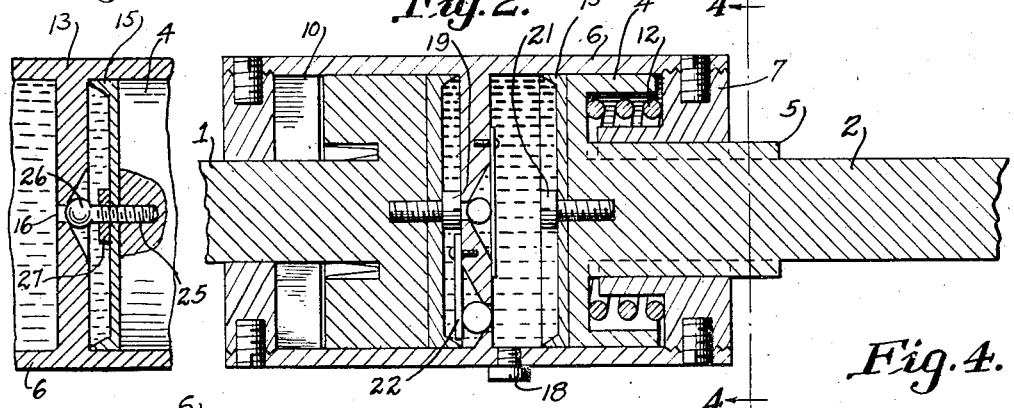
Fig.4.
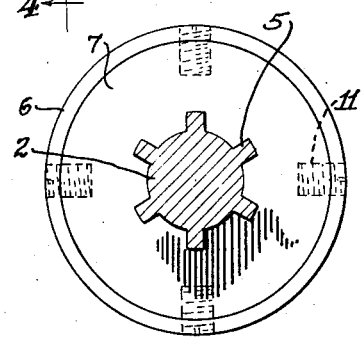
Fig.3.
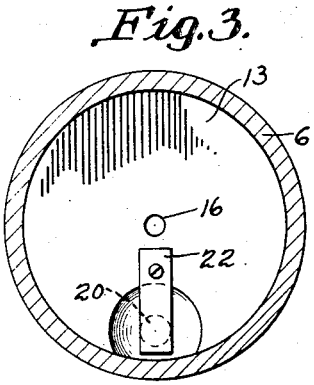
Fig.5.
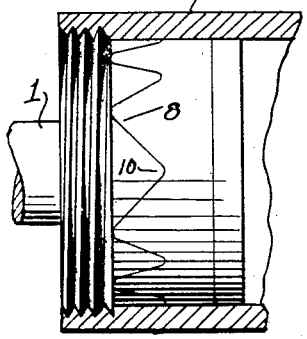
Inventor
Edwin K. LeFevre
By Herbert L. Davis
Attorney Patented July 25, 1933

1,919,437

UNITED STATES PATENT OFFICE

EDWIN K. LE FEVRE, OF EDGEMOOR, MARYLAND, ASSIGNOR TO WHITFIELD ENGINEERING COMPANY, OF DISTRICT OF COLUMBIA, A CORPORATION OF DELAWARE

SHAFT COUPLING

Application filed June 28, 1932. Serial No. 619,782.

This invention relates to shaft couplings of that type which automatically disengage the driving and driven members at a predetermined overload value.

Such couplings as usually constructed include interdigitating members such as sloping teeth which move outwardly upon one another progressively as the torque increases until they reach the point of disengagement. The defect of such couplings is that for any value of overload less than that at which the coupling releases, the teeth remain engaged at less than their full depth, thus reducing the shear-resisting cross section of the coupling as the torque increases, and if the load is carried by the end portions only of the teeth, it frequently results in the teeth being stripped.

The present invention obviates this defect by holding the teeth positively in full depth engagement throughout the rise in torque value, until the predetermined release value has been attained.

This is accomplished by interposing a body of incompressible liquid between the relatively movable walls of a closed chamber, said chamber being so related to the teeth that it tends to contract in capacity as the teeth tend to move apart, but is prevented from doing so by the presence of the incompressible liquid. The pressure of the torque is thus transmitted to the liquid which fills said chamber, means being provided so that when the torque exceeds the value predetermined as the release point of the coupling, a component of the pressure of the liquid, of predetermined small value, acts to open an outlet for the liquid, which escaping from the chamber permits the teeth suddenly and completely to unmesh.

The invention of course contemplates the provision of means for restoring the parts, including the displaced liquid, to normal operative relation.

Other objects of the invention will appear as the following description of a preferred and practical embodiment thereof proceeds.

In the drawing which accompanies and forms a part of the following specification and throughout the several figures of which the same characters of reference have been employed to designate identical parts, Figure 1 is a longitudinal section of a coupling embodying the principles of the invention, the parts being shown in engaged relation.

Figure 2 is a similar view, the parts being disengaged.

Figure 3 is a cross section taken along the line 3—3 of Figure 1.

Figure 4 is a cross section taken along the line 4—4 of Figure 2.

Figure 5 is a side elevation, partly in section showing the meshing teeth of the coupling.

Figure 6 is a fragmentary view partly in section showing a modified detail of the invention.

Referring now in detail to the several figures and first adverting to that group including Figures 1 and 2 and 5, the numerals 1 and 2 represent the driving and driven shafts each of which is provided with a disc-like head 3 and 4, respectively which as will presently be seen function as pistons, and are preferably of the same diameter.

The shaft 2 is provided adjacent the head 4 with a series of longitudinal splines 5 and said shaft is provided with an extension in the form of a sleeve cylinder 6 having a head 7 formed with spline grooves receiving the splines 5 and by means of which the cylinder 6 is slidably mounted on the shaft 2.

The shafts 1 and 2 are in alignment, the cylinder 6 embracing both piston heads 3 and 4. The outer face of the piston head 3 is provided with an annular series of teeth 8 and the adjacent end of the cylinder 6 is closed by a cylinder head 9 slidable on the shaft 1 and being provided with teeth 10 with which the teeth 8 on the piston head 3 intermesh. It will be understood that when the cylinder 6 is slid in a leftward direction with reference to Figures 1 and 2 the teeth are disengaged so that the shaft 1 together with the piston head 3 is freed from the shaft 2 and its extension, the cylinder 6, this position of the parts being shown in Figure 2, and that when the cylinder 6 is moved to the right the teeth are brought into engagement and the driving and driven shafts are coupled.

Figure 5 shows that the teeth 8 and 10 have sloping faces on both sides. It is obvious that in the absence of any other mechanism than has been described up to this point, the driving torque will tend progressively to separate the driving and driven teeth, the sloping sides of one series sliding outward against the sloping sides of the other series.

In the illustrated embodiment of the invention the teeth slope on both sides, indicating that the coupling disengages in response to overload in either direction of rotation. The cylinder heads 7 and 9 may be secured in any suitable manner. They are here shown as being screwed into the respective ends of the cylinder, and held in placed by deeply imbedded set screws 11.

Normally the cylinder 6 is biased in a direction to keep the teeth 8 and 10 enmeshed, by a spiral spring 12 held in compression between the outer face of the piston head 4, and the head 7 of the cylinder.

The construction of the coupling is such that the piston heads 3 and 4 are spaced apart a definite and fixed distance and that the cylinder 6 has a septum or partition 13 adapted to traverse said space when the cylinder 6 is slidably operated. The piston heads 3 and 4 are provided with cup leathers 14 and 15 or their equivalent, making the space between the piston heads a fluid tight chamber, and the partition 13 has an aperture 16 closed by a transfer valve 23, the latter being normally held to its seat by a light leaf spring 24 or its equivalent, said aperture permitting the passage of fluid in said chamber from one side of said partition to the other in certain phases of operation of the device. The fluid employed may be any desirable incompressible liquid, such for example as water or oil.

It is apparent from an inspection of Figure 1 that if the space between the piston heads, and which will henceforth be designated as the chamber 17, were empty, the sole means for holding the teeth in engagement would be the spring 12, and that a torque value tending to cause the teeth to ride out upon one another to a position of disengagement would be yieldingly resisted by said spring alone, so that the teeth would progressively disengage, being open to the objection noted in connection with the statement of the objects of the invention.

The present invention contemplates the filling of the chamber 17 with the incompressible liquid, through the screw-closed aperture 18 while the parts were in position shown in Figure 2. It will be noted that the partition 13 abuts the head of the screw 19 which secures the cup leather to the piston head and thus determines the definite volume of that part of the chamber 17 on the right of said partition so as to insure its being completely filled each time it becomes necessary to replenish the hydraulic fluid.

With the parts in position as shown in Figure 2, that is to say, with the coupling in disengaged relation, all that it is necessary to do in order to couple the driving and driven shafts is manually or otherwise to slide the cylinder 6 toward the right. This forces open the ball valve 20 and permits liquid on the right hand of the partition 13 to flow through to the opposite side of the partition. The cylinder 6 is slid in the manner indicated until the screw 21 which secures the cup leather 15 in position abuts against the partition 13, or some element secured thereto, as indicated in Figure 1. The relation of the head of the screw 21 to the partition 13 is such that when the two elements are in contact the teeth 8 and 10 are enmeshed to their full depth. The valve 20 is normally maintained seated by means of a leaf spring 22 or its equivalent, secured to said partition, and the pressure of which spring is just sufficient to overcome the weight of the valve 20 and the thrust of the spring 12.

Assuming that the teeth are enmeshed as shown in Figures 1 and 5, the rising value of the driving torque will tend to cause the teeth to ride out upon one another, but this tendency can not be developed into actual movement of said teeth since the chamber 17 is a closed chamber and filled with a body of incompressible liquid. In consequence therefore, although the driving torque acting against the pressure of spring 12 would ordinarily cause the teeth to at least partially disengage any such movement of said teeth is inhibited by the presence of the liquid. It will be understood that while the liquid is in a static condition within the chamber 17 as indicated in Figure 1, the component of the driving torque which would move the teeth in an axial direction imposes a pressure upon the liquid in the chamber 17. Examining said chamber one will observe that its opposite walls are of different area, the wall represented by the cup leather 14 being circular, and in area being the entire cross section of the cylinder 6, while the opposite wall represented by partition 13 is equal to this area less the area of the aperture 16.

In the position of parts shown in Figure 1, the valve 23 being against the piston 4 becomes for the time, virtually a part of said piston and not a part of the partition, so that the effective fluid pressure at any time upon said partition is the pressure upon the annular area of said partition not including the pressure upon said valve.

Now, the pressure which is built up between the piston 3 and the partition by the torque is derived from the mechanical force tending to separate the teeth 8 and 10, that is to say, the force tending to draw the cylinder to the leftward as viewed in Figure 1. Now, the value of this force is equal to the pressure against the circular wall of the piston 3 and is therefore greater than the force on the partition 13. Consequently, we have an unbalanced force, the mechanical force acting at the teeth to move the cylinder to the leftward being greater than the force acting upon the partition to hold the cylinder in its rightward position. Consequently, the cylinder will move to the left just as soon as the differential between these forces exceeds the pressure value acting upon the area of the aperture 16, reaches a point at which the pressure of the spring 12 is overcome. Up to this time, all movement of the cylinder is inhibited by the incompressible fluid in the chamber 17, and therefore the teeth 8 and 10 remain enmeshed to their full depth.

When once disengaged, the driving and driven elements will run free, there being no return of the liquid until the valve 20 has been opened by the manual or otherwise moving of the cylinder 6 into teeth engaging relation.

In Figure 6 a slight modification of the invention is shown in which the free valve 23 already described, is substituted by a projection 25 integral with, or in any suitable manner made fast to the piston head 4 and having a valve face 26 which seats upon the wall of the aperture 16. When the pressure upon the valve end of said projection becomes sufficient to contract the spring 12 and permit the cylinder to slide towards release position of the coupling, the aperture 16 is opened. This construction obviates the need of providing the return valve or its equivalent.

It will be understood from the above description that I have invented an automatic coupling released by a torque value representing a predetermined overload in which the movement towards release position does not take place progressively but only when the limit of overload has been attained, that after release, the coupling will run free in release position without risk of inadvertent reengagement, and that the driving and driven parts can be recoupled by the simple act of sliding the cylinder 6 manually or otherwise in a direction to reengage the driving and driven teeth; that only a light spring is necessary in order to maintain the parts in engaged relation, since the pressure of the spring is multiplied by the ratio which the area of the partition 13 bears to the much smaller area of the aperture 16.

It is understood that the details of construction as shown and described, are merely by way of example and are by no means to be considered as limiting the scope of the invention as defined by the terms of the appended claims.

What I claim as my invention is:

1. Shaft coupling comprising driving and driven shafts, intermeshing teeth connecting said shafts, said teeth being so shaped that a component of the driving torque tends to force them apart, a spring for yieldingly holding said teeth in engagement, hydraulic means normally statically impounded between said teeth and spring for storing the said component of the driving torque, and means responsive to a component of a predetermined pressure built up in said impounded means for overwhelming the tension of said spring and unbalancing the static pressure of said hydraulic means in a direction to cause immediate and complete disengagement of the teeth of said coupling.

2. Shaft coupling comprising driving and driven shafts, a sleeve splined on one shaft and rotatably embracing the other, intermeshing teeth on said sleeve and the last named shaft so shaped that a component of the driving torque tends to force them apart, said teeth being engaged or disengaged by the sliding of said sleeve in one or the other direction, a spring normally holding said sleeve in the position in which said teeth are engaged, means defining with said sleeve a chamber between said shafts, said sleeve having a partition in said chamber biased to one side thereof by said spring, said partition being formed with an aperture, making the area of said partition slightly less than the area of the opposite wall of said chamber, an outwardly opening valve normally closing said aperture under pressure of said spring, said chamber being filled with an incompressible liquid normally in static state for positively holding said sleeve in teeth-engaging position, said valve being adapted to open when the differential of the pressure impressed upon the incompressible liquid, between the partition and the opposite wall of said chamber, rises to a value sufficient to overcome said spring, permitting the displacement of the hitherto static liquid to the other side of said partition, whereby the immediate and complete disengagement of said teeth takes place.

3. Shaft coupling comprising driving and driven shafts, a cylinder having heads at its opposite ends, one head being splined on one shaft and the other head rotatably embracing the other shaft, piston heads at the ends of said shafts co-acting with the walls of said cylinder and spaced apart, intermeshing teeth on the inner face of one cylinder head and the outer face of the adjacent piston head, said teeth being so shaped that a component of the driving torque tends to force them apart, said teeth being engaged or disengaged by the sliding of said cylinder in one or the other direction, a spring normally holding said cylinder in the position in which said teeth are engaged, said piston heads and cylinder defining a chamber between said shafts, said cylinder having a partition in said chamber acting as a piston, and normally biased to one side of said chamber by said spring, said partition being formed with an aperture, making the area of said partition slightly less than the area of the opposite wall of said chamber, an outwardly opening valve normally closing said aperture under pressure of said spring, said chamber being filled with an incompressible liquid normally in static state, for positively holding said cylinder in teeth-engaging position, said valve being adapted to open when the differential of the pressure impressed upon said incompressible liquid, between the partition and the opposite wall of said chamber, rises to a value sufficient to overcome said spring, permitting the displacement of the hitherto static liquid to the other side of said partition, whereby the immediate and complete disengagement of said teeth takes place.

4. Shaft coupling as claimed in claim 3 the spring abutting the inner face of the splined cylinder head and the outer face of the adjacent piston head.

5. Shaft coupling as claimed in claim 3 including a positive stop on the piston head having the teeth, for limiting the teeth-disengaging movement of said cylinder.

6. Shaft coupling as claimed in claim 2 including a return valve for restoring the liquid to the opposite side of said partition when said cylinder is slid to teeth engaging position.

7. Shaft coupling as claimed in claim 2 said valve comprising a fixed projection against which the walls of the aperture in said partition are normally forced by the tension of said spring.

8. Shaft coupling comprising driving and driven shafts axially aligned and spaced apart, having diametrically enlarged piston heads at their adjacent ends, a cylinder slidably embracing said piston heads defining between them a chamber, cylinder heads at the ends of said cylinder, one splinably secured to one of said shafts whereby the cylinder becomes an extension of that shaft, and the other cylinder head rotatably embracing the other shaft behind its piston head, co-acting teeth on last named piston head and the adjacent face of the last named cylinder head, a spring housed between the opposite cylinder head and its adjacent piston head, normally holding said cylinder yieldingly in teeth-engaging position, said teeth having sloping faces whereby a component of the driving torque tends to force the teeth apart, said cylinder being provided with a partition in said chamber forming a movable wall for said chamber, said chamber being filled with an incompressible liquid between said partition and the piston head having the teeth, for positively holding said cylinder in teeth-engaging position while said liquid is in static state, said partition being formed with an aperture making the area of said partition exposed to the incompressible liquid slightly less than the area of the opposite piston head, a valve closing said aperture exteriorally under pressure of said spring and adapted to open when the differential of the pressure between the opposite walls of said chamber rises to a value sufficient to overcome said spring, permitting the displacement of the hitherto static liquid to the other side of said chamber, whereby immediate and complete disengagement of said teeth takes place.

9. Shaft coupling as claimed in claim 2 including a return valve carried by said partition for restoring the liquid to the opposite side of said partition when said cylinder is moved to teeth-engaging position, and means for normally holding said valve closed against back pressure of said spring while said teeth are disengaged.

10. Shaft coupling as claimed in claim 2, said valve comprising a fixed projection against which the walls of the aperture in said partition are normally forced by the tension of said spring, and a return valve opening oppositely from the aforementioned valve for permitting return of the liquid to the opposite side of said partition when the cylinder is moved to teeth-engaging position.

11. Shaft coupling comprising driving and driven shafts, an axially slidable coupling element forming an extension of one shaft, said slidable coupling element and the other shaft having inter-engaging over-load released elements, and fluid pressure means for inhibiting any torque-induced releasing movement of said inter-engaging elements until the over-load value has been attained.

EDWIN K. LeFEVRE.